M. G. ADAMS.
FLYING MACHINE.
APPLICATION FILED APR. 24, 1909.
1,003,859.
Patented Sept. 19, 1911.
4 SHEETS—SHEET 2.
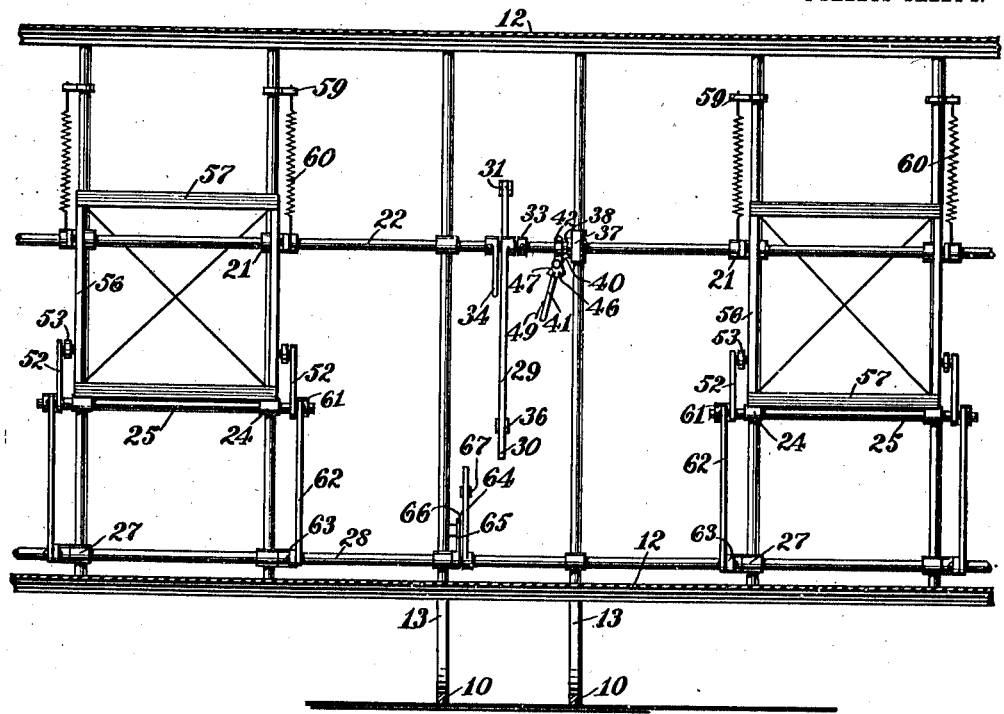
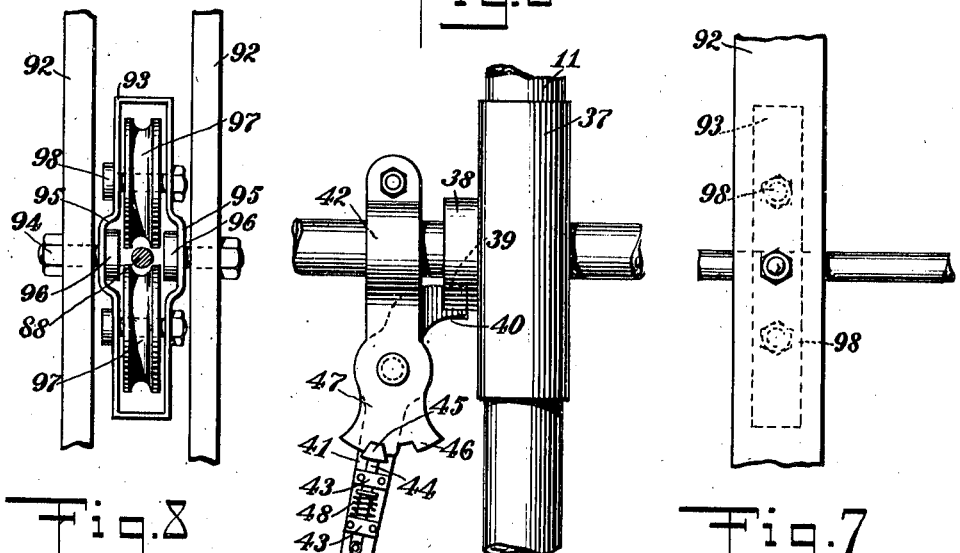
WITNESSES
INVENTOR
Malcolm G. Adams.
BY
ATTORNEYS

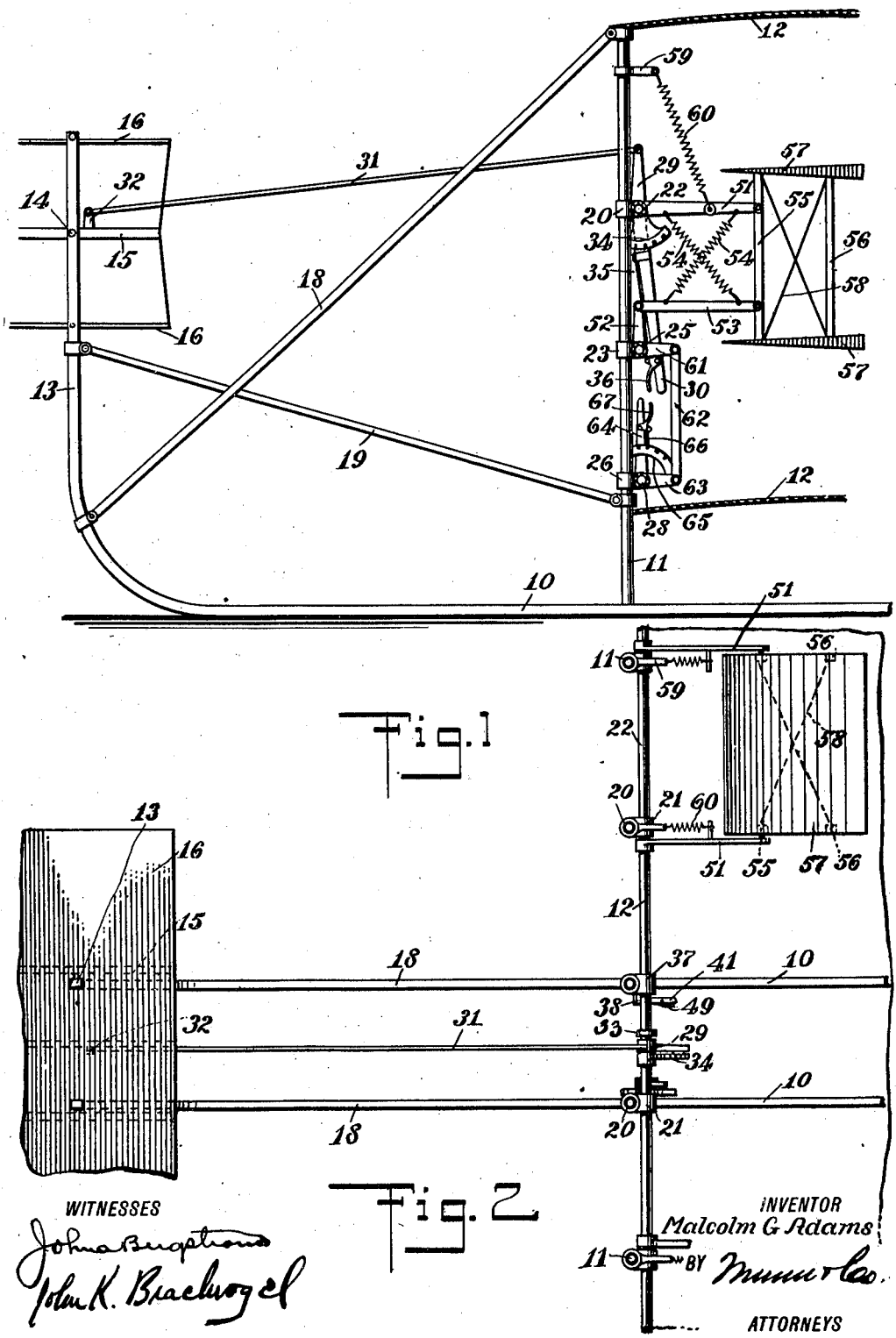

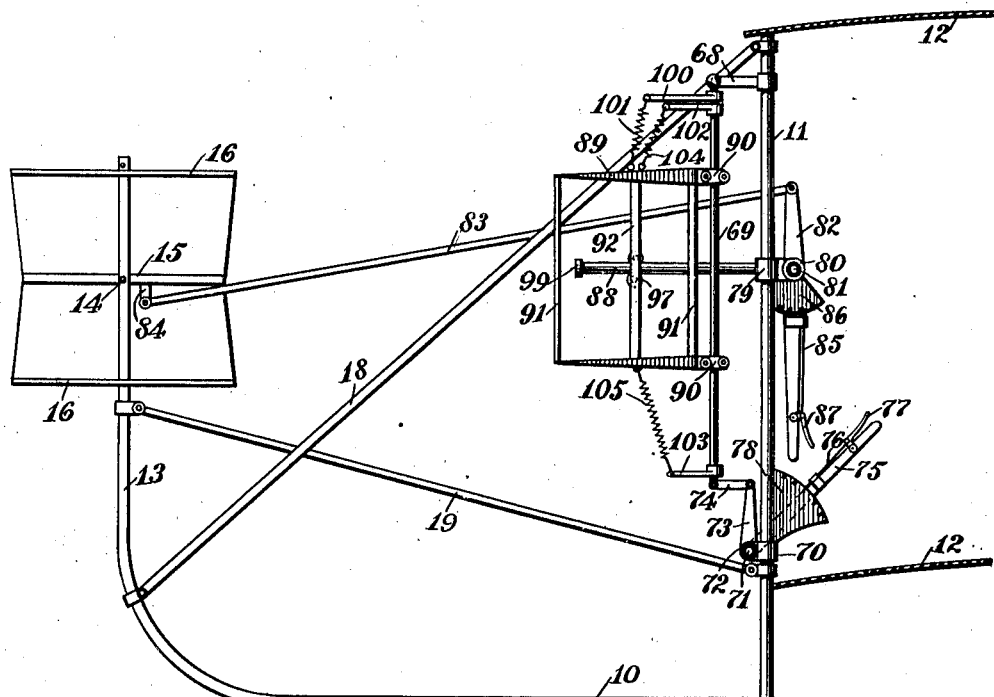
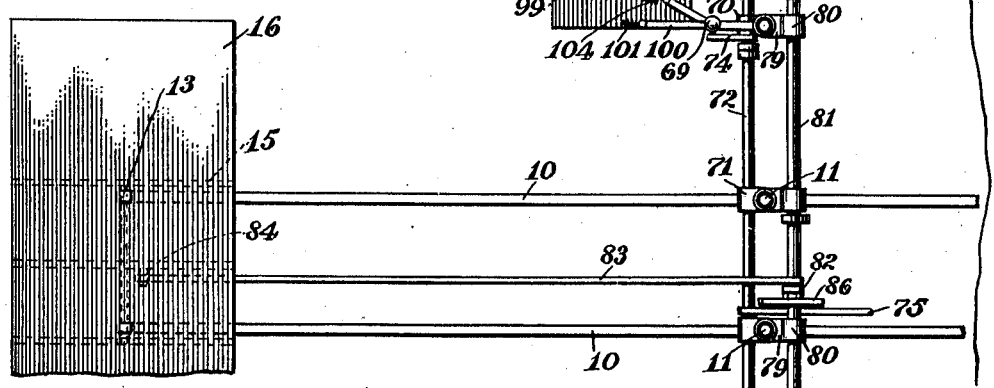

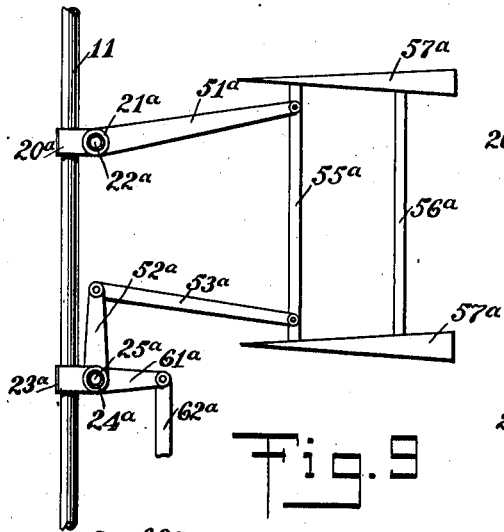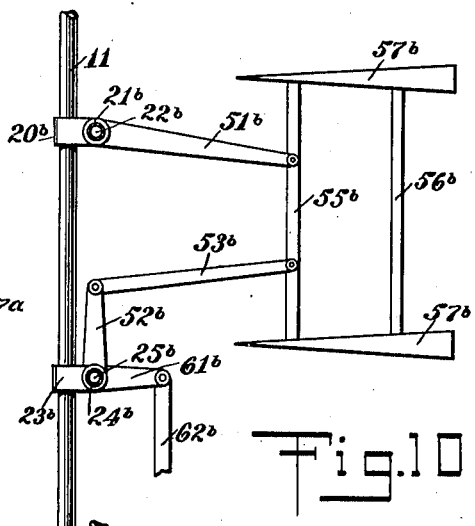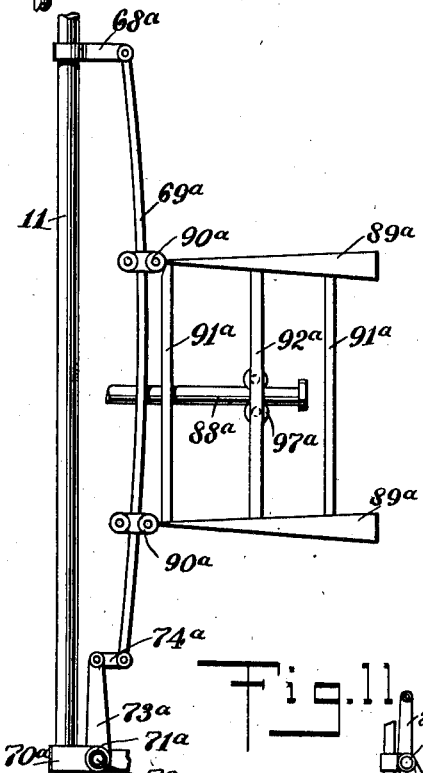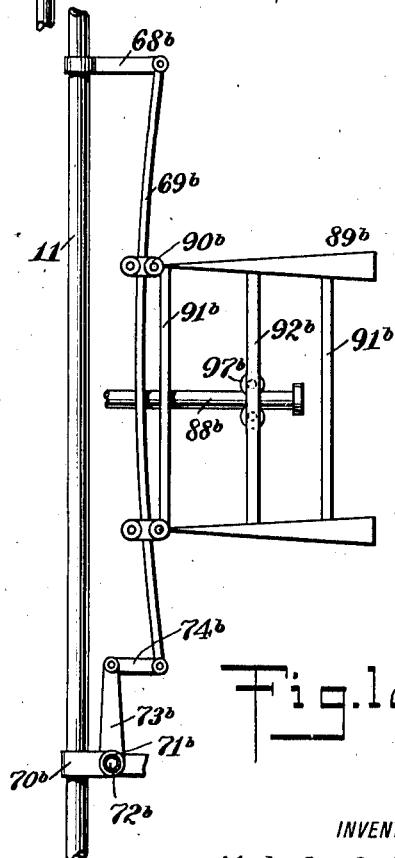

UNITED STATES PATENT OFFICE.

MALCOLM GROVER ADAMS, OF PARSONS, KANSAS.

FLYING-MACHINE.

1,003,859.  Specification of Letters Patent.  Patented Sept. 19, 1911.

Application filed April 24, 1909. Serial No. 491,901.

*To all whom it may concern:*

Be it known that I, MALCOLM GROVER ADAMS, a citizen of the United States, and a resident of Parsons, in the county of Labette and State of Kansas, have invented a new and Improved Flying-Machine, of which the following is a full, clear, and exact description.

This invention relates to flying machines and more particularly to a flying machine in which is provided a steering surface or rudder, and a controlling surface operatively connected with the steering surface and arranged to move bodily under the influence of air pressure thereagainst.

The object of the invention is to provide a simple and efficient airship in which the stability in flight of the machine is automatically controlled.

A further object of the invention is to provide a machine of the class described in which a surface normally free to move bodily controls a steering or guiding surface, so that if the machine executes an irregular movement the pressure of the wind or air against the unbalanced or movable surface operates the same, in turn to operate the guiding surface, to direct the airship so that it returns to its course, or to reestablish its fore and aft or other stability.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of an airship having an embodiment of my invention applied thereto; Fig. 2 is a plan view of a part of the airship showing my attachment; Fig. 3 is a partial, transverse section of the machine; Fig. 4 is a side elevation of an airship having a modified form of my invention applied thereto; Fig. 5 is a plan view of a part of the airship showing the modified attachment; Fig. 6 is an enlarged elevation showing a detail; Fig. 7 is an enlarged elevation showing a further detail; Fig. 8 is a front elevation of the detail shown in Fig. 7; Fig. 9 is a side elevation of a pair of controlling surfaces of modified form; Fig. 10 is a similar view showing a pair of controlling surfaces of further modified form; Fig. 11 is a similar view showing a pair of controlling surfaces of still further modified form; and Fig. 12 is a similar view showing a pair of controlling surfaces like to those shown in Fig. 11, but slightly modified.

Before proceeding to a more detailed explanation of my invention, it should be understood that the present application discloses various modified forms of the device shown in my co-pending application filed April 18, 1909, under the Serial No. 690,663. In the latter I described a flying machine in which a guiding surface was operatively connected with a controlling surface which was free to swing. In the present application is shown a controlling surface which is free to move bodily and in which the series of details of construction such as the means for operatively and adjustably connecting the controlling surface or surfaces with the steering surface or surfaces, are improved. Needless to say, the present form or forms of the invention can be applied to various types of flying machines, and I have merely used the machine shown in the accompanying drawings for example.

The expressions "to move bodily," and "bodily movement," used herewith in the description of the operation of my invention, mean that the parts referred to, when they change their positions under the influence of air pressure, or for other causes, move from one position to another in parallelism; that is, each successive position is substantially parallel to a preceding position, or a subsequent one. In addition, the bodily movement also means a movement other than a pivotal one about an axis lying within the part itself. The expression "free movement" is used to indicate that the parts referred to are not held rigidly against movement, but are restrained in their normal positions resiliently only, and are free to move under the influence of air pressure, or for other causes. In saying that the controlling surfaces can move bodily, it is not intended to limit their movements to one of absolute parallelism, for slight differences of angularity with respect to the horizontal are permissible, so that the movement is substantially one of parallelism. The term might be more exactly described by saying that it means that the entire part changes its position when moved.

Referring more particularly to the drawings, the flying machine has skids or runners 10 carrying the uprights 11 upon which are mounted the supporting surfaces or aeroplanes 12. The forward ends 13 of the skids 10 are upwardly disposed and have therebetween a shaft 14 upon which is mounted the frame 15 of the rudder which is provided with steering or guiding surfaces 16. Struts 18 join the forward ends of the skids and the upper ends of certain of the uprights 11. Bracing members 19 likewise connect the ends 13 of the skids and the uprights 11, near their lower extremities.

Brackets 20 are rigidly mounted upon the uprights 11 and have bearings 21 in which is journaled a main shaft 22. Further brackets 23 underneath the brackets 20 have bearings 24 in which are journaled short shafts 25. The shaft 22 extends for substantially the entire width of the airship, whereas the short shaft 25 extends merely from one upright 11 to an adjacent upright, as is shown most clearly in Fig. 3. Near the lower ends of the uprights 11 are provided still further brackets 26, having bearings 27 in which is journaled a further shaft 28 similar and parallel to the shaft 22.

A hand lever 29 is loosely mounted upon the shaft 22 and has a grip 30 by means of which it is manually controlled. A link 31 is pivotally connected at one end with the upper extremity of the lever 29 and at the other end with an arm 32 rigid with the frame 15 of the rudder whereby the latter can be controlled by means of the lever. A collar 33 rigid upon the shaft 22 prevents the movement of the lever 29 longitudinally of the shaft 22 in one direction. At the other side of the lever is mounted upon the shaft a rigid segment 34 adapted to be engaged by a movable member 35 controlling a rocking handle 36 pivoted upon the lever. By means of the segment 34 and the member 35 the lever can be releasably connected with the shaft 22.

One of the uprights 11 has a special bracket 37, the shaft bearing 38 of which is provided with notches 39 adapted to be engaged by the nose 40 of a short lever 41 pivoted at a bracket 42 rigidly carried by the shaft 22. The short lever 41 has guides 43 in which is slidably mounted a member 44 having a head 45 adapted to engage notches 46 of an extension 47 of the bracket 42. A spring 48 is mounted upon the member 44 and normally forces the head 45 toward the notches 46. A rocking handle 49 pivoted upon the lever is operatively connected by means of a link 50 with the member 44. By means of this lever the shaft can be held against turning movements and the member 44 permits the lever 41 to be operatively or inoperatively disposed.

The shaft 22 has rigid, rearwardly extending arms 51. The shaft sections 25 have rigid, upwardly extending arms 52. The latter have pivotally secured at the ends, members 53 substantially parallel to the arms 51 and connected with the same by means of crossed springs 54 which tend to hold the parts in normal positions, the arms 51 and the members 53 being pivotally connected with frame uprights 55 which, together with similar members 56, carry the controlling surfaces 57. The latter are preferably arranged in pairs and are normally parallel. Crossed ties 58 join the members 55 and 56 to brace the structure. Certain of the uprights 11 have rigid stubs 59 to which are secured springs 60, the lower ends of which are fastened at the arms 51. These springs 60 counteract the weights of the parts and hold the surfaces 57 in normal, substantially horizontal positions, in the normal position of the flying machines. The shaft sections 25 have further, rigid arms 61 pivotally connected by means of links 62 with similar arms 63 rigidly mounted upon the shaft 28. A lever 64 rigid with the shaft 28 serves for manually controlling the same. A notched segment 65 rigidly secured upon one of the uprights 11 is positioned adjacent to the lever 64 and is arranged to be engaged by a member 66 movably mounted upon the lever and controlled by a rocking handle 67 so that the lever 64 can be locked in a plurality of positions. The shaft 28 serves for the adjustment of the controlling surfaces. By suitably moving the lever 64, the shaft 28 can be operated so that through the shaft sections 25 the angles of both sets of controlling surfaces relative to the lifting planes 12 can be changed. It will be understood that these move bodily, the arm 51 and the member 53 constituting a parallel motion frame.

The adjusting shaft 28 is used when the controlling surfaces are in such position that they tend to steer the machine either up or down; consequently, if the machine tends to dip in front because the lifting planes 12 are at their normal angle with the horizontal, the air strikes the controlling planes on the under sides and these then tend to give the front rudder a negative angle with respect to the horizontal. To overcome this action the lever 64 is moved backward a notch or two, thereby adjusting through the connections, the controlling planes, so that the air pressure is equalized on the top and the bottom thereof; that is, it is balanced, and the controlling planes will then tend to remain in normal, central positions and will not interfere with the steering of the machine straight ahead. Naturally if the tendency of the machine is to rise, the reverse adjustment of the parts is necessary.

In Figs. 4 and 5 is illustrated a modified form of the device in which the pairs of controlling surfaces are arranged to slide bodily upward and downward upon suitable guide supports. Certain of the uprights 11 at the upper ends have rigidly projecting arms 68. Pivotally secured at the ends of the arms 68 are guides 69 which are substantially vertical in the normal position of the machine, and which, in the form of the device shown in the drawings, are arranged in front of the uprights 11 owing to the fact that the arms 68 project in that direction. It will be noted that in the already described form of the invention, the pairs of controlling surfaces are at the rear of the uprights 11. The parts can of course be reversed and the controlling surfaces can be positioned in front of the uprights, as is the case in the type shown in Figs 4 and 5. In this type too the parts can be reversed if this is found to be desirable.
Near the lower ends, the uprights 11 have brackets 70 provided with bearings 71 in which is journaled a transverse-adjusting shaft 72. The latter has rigid arms 73 operatively connected with the lower ends of the guides 69 by means of links 74. An adjusting lever 75 is rigidly secured to the shaft 72 and has a movable member 76 controlled by a rocking handle 77 and adapted to engage notches of a notched segment 78 to lock the shaft in a plurality of positions. The uprights 11 have further brackets 79 provided with bearings 80 in which is journaled the main shaft 81. The controlling lever 82 loose upon the shaft 81 is operatively connected by means of a link 83, with a downwardly disposed stub 84 secured to the frame 15 of the front rudder. The lever has the customary member 85 adapted operatively to engage the notched segment 86 and controlled by the rocking handle 87 as is the case in the other form of the device.

The shaft 81 has pairs of forwardly extending rigid members 88 arranged between the units of the pairs of controlling surfaces
89. These are preferably wedge-shaped and at the broader ends have roller carriers 90 by means of which they are movably mounted upon the guides 69. They are joined by connecting members 91 which space them rigidly. Between the surfaces of each pair are positioned spaced bars 92 which receive therebetween the members 88, and between the bars 92 are positioned yokes 93 which are pivotally held in place by means of pivot bolts 94 arranged in suitable openings of the bars. The yokes have offset bars 95 in which are located heads 96 of the bolts 94. Pivotally carried by the yokes are spaced, grooved rollers 97 pivotally mounted in place by means of suitable bolts 98. The members 88 pass between the grooved rollers and are thus movably connected with the pairs of controlling surfaces. Each of the members 88 at the free end has a head 99 which limits the downward and upward movement of the surfaces by engaging the rollers. It will be understood, that as the surfaces move upward and downward, the members 88 are correspondingly elevated or depressed, and thereby operate the shaft 81 to control the rudder. The provision of the pivoted yokes 93 prevents the binding of the members 88 when they assume angular positions. The guides 69 have rigid arms 100 which are connected by means of springs 101 with the controlling surfaces. These springs balance the weight of the controlling surfaces. The guide supports have further arms 102 and 103 at the upper and lower ends respectively, connected by means of springs 104 and 105 with the surfaces. These last-mentioned springs tend to hold the surfaces in normal, substantially central positions.

It will be understood that by means of the adjusting shaft 72 the guide supports 69 can be moved inward and outward to regulate the positions of the controlling surfaces and thereby to adjust the same with respect to the lifting planes 12, as is the case in the previously described form of the device, wherein the controlling surfaces are regulated by adjustments of the shaft 28.

In the forms of the device described above, the controlling planes when set at a given angle with respect to the lifting planes 12 can move upward and downward, but maintain this relative angle with respect to the planes 12. If so desired the controlling planes can be arranged to vary this angle relative to the lifting planes as they change their positions in moving upward or downward. The arrangement shown in Fig. 9 is similar to that illustrated in Fig. 1, the corresponding parts in Fig. 9 having the letter "a" added to the reference numerals indicating them. These parts are similar to those of the form of Fig. 1, with the exception that the arm 51$^a$ and the member 53$^a$ are not parallel as is the case of the arm 51 and the member 53. Consequently the structure is not similar to that of a parallel motion frame, and the angularity of the planes 57$^a$ changes as they move bodily upward and downward. As the planes move upward they assume a less positive angle with the horizontal and the tendency is thereby to limit the travel. In Fig. 10 the parts are again similar, the reference numerals having added thereto the letter "b." The difference in this figure however, is that the arm 51$^b$ and the member 53$^b$ have a different angular relation so that as the planes 57$^b$ move upward their positive angle with respect to the horizontal increases.

In Figs. 11 and 12 are shown other forms of the device similar to that illustrated in Figs. 4 and 5, the respective letters "a" and "b" being added to the reference numerals of the corresponding parts. In these forms of the device the guide supports however, are curved so that the controlling surfaces 89ª and 89ᵇ may assume different angles with respect to the lifting planes as they move upward and downward.

Having thus described my invention, I claim as new, and desire to secure by Letters Patent:—

1. In a flying machine, a steering surface, a plurality of independent controlling surfaces, and common means for operatively connecting said controlling surfaces and said steering surface.

2. In a flying machine, a steering surface, a plurality of independent pairs of superposed, rigidly connected, controlling surfaces, means for operating said steering surface, and common means for operatively connecting said first means and said pairs of surfaces.

3. In a flying machine, a rudder, a shaft, a lever loosely carried by said shaft and operatively connected with said rudder, means for adjustably and rigidly connecting said shaft and said lever, a controlling surface, and a parallel motion frame connecting said controlling surface and said shaft.

4. In a flying machine, a rudder, a shaft, a lever loosely mounted upon said shaft, a link connecting said lever and said rudder, means for operatively and rigidly connecting said lever and said shaft, a controlling surface free to move bodily, a connection between said surface and said shaft, whereby said surface is constrained to move in predetermined directions, and a spring tending to hold said surface in a normal position.

5. In a flying machine, a rudder, a shaft, a lever loose upon said shaft, a link connecting said lever and said rudder, means for adjustably connecting said lever and said shaft, an arm rigid with said shaft, a second shaft having an arm, a member pivotally connected with said arm of said second shaft and constituting with said arm of said first shaft, a parallel motion frame, and a controlling surface connected with said arm of said first shaft and said member.

6. In a flying machine, a rudder, a shaft, means for operatively connecting said shaft and said rudder, a second shaft, a parallel motion frame comprising members each connected with one of said shafts, and a controlling surface secured to said members.

7. In a flying machine, a rudder, a shaft, a second shaft, a parallel motion frame comprising members each connected with one of said shafts, means for adjusting one of said shafts and for holding it in a plurality of positions, a controlling surface connected with said members, means for operatively connecting one of said shafts and said rudder, and springs tending to hold said controlling surface and said members respectively in normal positions.

8. In a flying machine, a rudder, a shaft a lever loosely mounted upon said shaft, a link operatively connecting said lever and said rudder, a segment rigid with said shaft, a member slidable upon said lever and adapted to engage said segment to lock said lever with respect to said shaft, a parallel motion frame connected with said shaft, and a controlling surface secured to said frame.

9. In a flying machine, a rudder, a shaft, a lever loose upon said shaft, a link operatively connecting said lever and said rudder, means for locking said lever with respect to said shaft, a second shaft, an arm rigid with said first shaft, an arm rigid with said second shaft, a member pivotally secured to said arm of said second shaft, a spring tending to hold said member parallel with respect to said arm of said first shaft, and a controlling surface secured to said arm of said first shaft and said member.

10. In a flying machine, a rudder, a shaft, a lever mounted upon said shaft and operatively connected with said shaft, a second shaft, an arm rigid with said first shaft, an arm rigid with said second shaft, a member secured to said arm of said second shaft and constituting with said arm of said first shaft a parallel motion frame, a controlling surface secured to said frame, a third shaft, a link connecting said third shaft and second shaft, and means for adjusting said third shaft.

11. In a flying machine, a rudder, a shaft, a lever controlling said shaft and operatively connected with said rudder, an arm rigid with said shaft, a second shaft, an arm rigid with said second shaft, a member pivotally secured to said arm of said second shaft and constituting with said arm of said first shaft, a parallel motion frame, a spring tending to hold said member and said arm of said first shaft parallel, a controlling surface secured to said parallel motion frame, a third shaft, an arm rigid with said third shaft, said second shaft having a further arm rigid therewith, a link connecting said further arm of said second shaft and said arm of said third shaft, and means for adjusting said third shaft.

12. In a flying machine, a rudder, a shaft, a lever loose upon said shaft and carrying a movable member, a notched segment rigid with said shaft and adapted to be engaged by said member to lock said lever with respect to said shaft, a link operatively connecting said rudder and said lever, an arm rigid with said shaft, a second shaft, an arm rigid with said second shaft, a member pivotally secured to said arm of said second shaft and constituting, with said arm of said first shaft, a parallel motion frame, a pair of controlling surfaces, members rigidly connecting said surfaces, one of said members being secured to said arm of said first shaft and said first-mentioned member, springs connecting said arm of said first shaft and said first-mentioned member, and tending to hold them in normal positions, a third shaft, further arms rigid with said second shaft and said third shaft, a link connecting said further arms, a fixed, notched segment, a lever rigid with said third shaft and having a movable member adapted to engage said fixed segment to hold said third-shaft in a plurality of adjustments, and a spring having one end fixed and the other end secured to said arm of said first shaft, whereby said spring tends to counterbalance the weight of said controlling surfaces.

In testimony whereof I have signed my name to this specification in the presence of two subscribing witnesses.

MALCOLM GROVER ADAMS.

Witnesses:
LEILA L. WILSON,
ORA F. ADAMS.